UNITED STATES PATENT OFFICE.

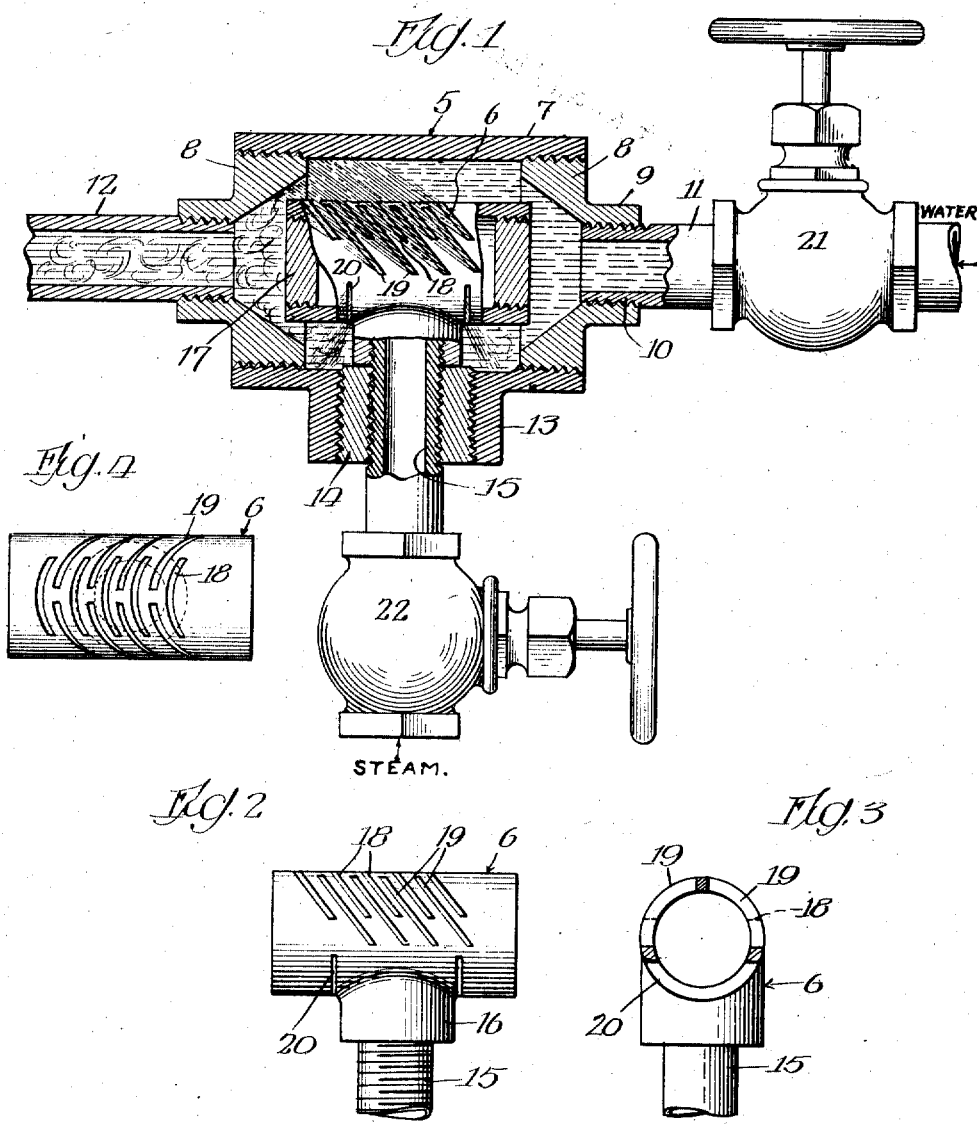

DAVID R. SAUNDERS, OF ST. LOUIS, MISSOURI; JAMES P. NEWELL ADMINISTRATOR OF SAID DAVID R. SAUNDERS, DECEASED.

COMBINED WATER HEATER AND CIRCULATOR.

1,245,985.  Specification of Letters Patent.  Patented Nov. 6, 1917.

Application filed October 9, 1916. Serial No. 124,688.

*To all whom it may concern:*

Be it known that I, DAVID R. SAUNDERS, a citizen of the United States, residing at St. Louis, in the State of Missouri, have invented certain new and useful Improvements in Combined Water Heaters and Circulators, of which the following is a specification.

The present invention relates to a device for injecting steam into a stream or body of water, thereby raising the temperature of said body, and so projecting the steam into the water as to accelerate the flow of the latter through the conduit.

The principal object of the invention is to provide a cheap and simple device which will utilize the exhaust or other steam from any suitable source for the purpose of raising the temperature of a body or stream of water, thereby enabling the production of hot water for various purposes in any quantity desired and at any time, and without the use of storage or other tanks which are commonly necessary for having a continual supply of hot water on hand.

A further object of the invention is to so arrange the openings through which the steam is discharged from the steam casing into the water which is to be heated, as to produce what may be termed a curtain of steam, through which the water passing through the water casing must travel, thereby enabling a thorough and quick heating of all of the water.

A further object of the invention is to project the steam into the water at an angle so as to utilize the power of the steam for the purpose of accelerating the flow of water out of the water casing after it has been heated.

A further object of the invention is to arrange the slots in the steam casing, through which the steam is projected, in such relation to the surrounding body of water as to cause the greatest amount of steam to be projected where the greatest body of water exists, thereby insuring a thorough, uniform heating of all of the surrounding water.

The invention further consists in the features of construction and combination of parts hereinafter described and claimed.

In the drawings:

Figure 1 is a view of the device of the present invention, showing the water casing in section and the steam casing partly in section and partly in elevation;

Fig. 2, an elevation of the steam casing detached;

Fig. 3, a cross section of the steam casing; and

Fig. 4, a plan view of the steam casing.

The present invention relates, as stated, to a device for injecting steam into a body of water for raising the temperature of the same and accelerating the circulation thereof. In various lines of industry it is necessary to have a supply of hot water on hand for cleansing and similar purposes. In most all places where such a condition exists, there is steam power of one kind or another, and the present invention is adapted to utilize exhaust or waste steam from any source as the heating means for the water.

In most cases the need of hot water does not exist continuously, but where the ordinary hot water storage tank is used as a means for supplying hot water, it is, of course, necessary to maintain the water in heated condition at all times in order to have it constantly available for use, although it may only be actually used for a small portion of such time. By means of the present invention, the water can be heated instantaneously, and is therefore produced when required, with the elimination of storing a quantity, the advantage of which will be obvious.

The water may, of course, be heated for other purposes than cleansing, and may be used in connection with a circulating pipe for heating purposes; but the gist of the invention lies in the adaptability of the device to increase the temperature of the water very quickly, and to permit of this increased temperature being maintained for such length of time as is desired and to accelerate the movement of the heated water by the injected steam which heats it.

Referring now to the drawings, the device may be said to consist of a water casing 5 and a steam casing 6. The water casing consists of a chambered body 7 of suitable shape and size, closed at its end by plugs 8, each plug embodying a nipple 9, which is interiorly threaded to receive the end 10 of a pipe section.

Referring to Fig. 1, with the device as there shown, the nipple 9, at the right hand side of the drawings, receives the end 10 of a cold water pipe 11, while the nipple 9, at the left hand side of the drawings, receives the end 10 of a hot water pipe 12. This hot water pipe may be connected to a suitable form of nozzle or other instrument, or may be a portion of a circulating coil of a steam heating system.

The bottom of the water casing is formed with a neck 13, in which is placed a gland 14 receiving the threaded end of a steam supply pipe 15. This supply pipe, as shown, is threaded into the interior of a nipple 16 on the steam casing 6. The ends of the steam casing are closed by suitable plugs 17. The steam casing is formed with a plurality of elongated slots or openings, those lying at the upper portion of the casing being designated by the numeral 18, those lying at the upper portion and extending around to adjacent the lower portion being designated by the numeral 19, and those at the lower portion being designated by the numeral 20. This arrangement of the slots may be varied, but the above construction is well adapted to bring about an even heating of the water, as will hereinafter appear.

It will be observed that the slots 18 and 19 are diagonally disposed, as will be clearly seen from Figs. 1 and 2. It will also be seen that at the top and upper side portions of the steam casing, both the slots 18 and the slots 19 are acting to emit steam, that along the lower side portions of the casing the slots 19 are acting, while at the bottom part the slots 20 are acting. The steam casing is so placed within the water casing as to bring the largest volume of water on top of the steam casing, with the volume gradually decreasing from the top side to the under side of the steam casing.

By the arrangement of the slots heretofore described, the largest volume of steam is emitted at the top, with the volume gradually decreasing until the smallest volume is emitted at the bottom. Thus, the largest amount of steam is discharged where the steam casing is surrounded by the largest amount of water, and the smallest amount of steam is discharged where the casing is surrounded by the smallest body of water. This proportions the discharge of steam in accordance with the density of the water on which it is acting and makes a uniform heating of all portions of the water surrounding the steam casing.

By making the openings in the steam casing of the elongated slot variety, the discharge of steam from the casing may be comparable to a curtain, which serves to inject a relatively large quantity of steam into the water as it passes through the casing and into all portions thereof, thus quickly and efficiently raising the temperature of all parts of the water surrounding and passing by the steam casing. Obviously, this increases the heating action of the steam over a construction in which the steam is projected into only a portion of the water and the water so heated used to heat that part of the water not acted upon by the steam.

As is well known in physics, the raising of the temperature of the body of water at a given point will cause circulatory movement of said body, but in order to accelerate this movement, the steam is directed into the water at an angle, thereby utilizing the power of the projected steam to propel the water forward, and this in conjunction with the pressure of the cold water will serve to place the proper pressure on the hot water.

The cold water pipe 11 is provided with a suitable controlling valve 21, and the steam pipe 15 with a suitable controlling valve 22. Thus the flow of cold water and steam is controlled, so that the creation of hot water can be commenced or discontinued whenever desired. The valves 21 and 22 are opened, which allows of a flow of cold water from the pipe 11 into the interior of the water casing 5, and allows a flow of steam through the pipe 15 into the interior of the steam casing 6, from whence it passes out through the slots 18, 19 and 20, and into the body of cold water passing through the water casing 5. The entrance of the steam into the cold water raises the temperature of the same and accelerates the movement thereof, so that it is discharged from the water casing in the form of hot water under pressure.

The device is extremely simple of nature and can be easily installed and access to all of the parts obtained for the purpose of repairs, cleansing, etc. The form of device shown and described is, of course, susceptible to alteration, and it is not desired to restrict the invention in any way other than by the terms of the appended claims.

By the use of a plurality of slots, a plurality of curtains of steam are projected into the water casing, so that each particle of water is forced to pass through a plurality of these curtains in traveling through the water chamber. This, obviously, results in a greater heating efficiency, since by bringing it into contact with a plurality of these steam curtains, no portion of the water can pass through without being subjected to the action of the hot steam.

I claim:

1. In a device of the class described, the combination of a casing, means arranged at opposite ends of the casing for receiving and retaining the ends of water pipe sections, a chambered member within the casing, a steam supply pipe in communication with the interior of the chambered member, said chambered member being formed with a plurality of elongated slots for projecting curtains of steam into the interior of the casing, through which the water passes in traveling through the casing, substantially as described.

2. In a device of the class described, the combination of a casing, means arranged at opposite ends of the casing for receiving and retaining the ends of water pipe sections, a chambered member within the casing, a steam supply pipe in communication with the interior of the chambered member, said member being formed with a plurality of elongated slots extending in an angular direction for projecting curtains of steam into the interior of the casing, through which the water passes in traveling through the casing, and said angularity projecting the steam in the direction of the flow of the water through the casing, thereby accelerating said flow, substantially as described.

3. In a device of the class described, the combination of a casing, means arranged at opposite ends of the casing for receiving and retaining the ends of water pipe sections, a chambered member within the casing, a steam supply pipe in communication with the interior of the chambered member, said chambered member being formed with a plurality of elongated slots, a portion of said slots extending across the top and upper side part of the member, a portion of said slots extending across the top and upper lower side portions of said member, and a portion of said slots extending across the bottom of said member, whereby curtains of steam are projected into the casing and entirely around said member, through which curtains the water passes in traveling through the casing, substantially as described.

4. In a device of the class described, the combination of a casing, water piping connected to said casing to permit the passage of water therethrough, a chambered member within the casing, means for admitting steam to the interior of said member, and said member being formed with a series of elongated slots for projecting curtains of steam into the casing, through which the water passes in traveling through the casing, substantially as described.

5. In a device of the class described, the combination of a casing, piping connected to said casing to permit the passage of water therethrough, a chambered member within the casing, means for admitting steam to the interior of said member, said member being formed with a series of elongated, angularly-disposed slots for projecting curtains of steam into the casing, through which the water passes in traveling through the casing, and said angularity projecting the steam in the direction of flow of the water to accelerate said flow, substantially as described.

6. In a device of the class described, the combination of a casing, piping connected to said casing to permit the passage of water therethrough, a chambered member arranged eccentrically to the interior area of said casing, whereby it is surrounded by varying densities of water, said casing being provided with a plurality of openings, said openings being arranged to bring the greatest area thereof at the point where the member is surrounded by the greatest density of water, substantially as described 7. In a device of the class described, the combination of a casing, piping connected to said casing to permit the passage of water therethrough, a chambered member within the casing, means for admitting steam to the interior of said member, said member being arranged eccentrically to the interior area of the casing, whereby a greater volume of water passes across the top of the member than at the bottom, said member being formed with a series of elongated slots to project curtains of steam from around the member into the interior of the casing and through which curtains the water passes in traveling through the casing, a portion of said slots extending across the top and upper side portion of the member, a portion of said slots extending across the top and upper and lower side portions of said member, and a portion of said slots extending across the bottom of said member, whereby the greatest area of slot opening in said member is provided where the greatest density of water surrounds the member, substantially as described.

8. In a device of the class described, the combination of a casing, piping connected to said casing to permit the passage of water therethrough, a chambered member arranged eccentrically to the interior area of said casing, whereby it is surrounded by varying densities of water, said casing being provided with a plurality of openings, said openings being arranged to bring the greatest area thereof at the point where the member is surrounded by the greatest density of water, and said slots being angularly disposed to project the steam into the casing in the direction of flow of the water through the casing, thereby accelerating said flow, substantially as described.

9. In a device of the class described, the combination of a casing, piping connected to said casing to permit the passage of water therethrough, a chambered member within the casing, means for admitting steam to the interior of said member, said member being arranged eccentrically to the interior area of the casing, whereby a greater volume of water passes across the top of the member than at the bottom, said member being formed with a series of elongated slots to project curtains of steam from around the member into the interior of the casing and through which curtains the water passes in traveling through the casing, a portion of said slots extending across the top and upper side portion of the member, a portion of said slots extending across the top and upper and lower side portions of said member, and a portion of said slots extending across the bottom of said member, whereby the greatest area of slot opening in said member is provided where the greatest density of water surrounds the member, and said slots being angularly disposed to project the steam into the casing in the direction of flow of the water through the casing, thereby accelerating said flow, substantially as described.

D. R. SAUNDERS.